(12) United States Patent
Anjur et al.

(10) Patent No.: US 7,028,046 B2
(45) Date of Patent: Apr. 11, 2006

(54) METHOD OF SPLITTING A MULTI-DIMENSIONAL CUBE BETWEEN A MULTI-DIMENSIONAL AND A RELATIONAL DATABASE

(75) Inventors: Vaishnavi Anjur, Belmont, CA (US); Vijay K. Anjur, Sunnyvale, CA (US); Hemanta Banerjee, San Jose, CA (US); Maya Binkovich, Sunnyvale, CA (US); Srinivas Duvvuri, Santa Clara, CA (US); Mark Goldenshteyn, San Francisco, CA (US); Arun Kumar, Fremont, CA (US); Kevin Kaixuan Liao, San Jose, CA (US); Igor Nazarenko, Sunnyvale, CA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 382 days.

(21) Appl. No.: 10/101,664

(22) Filed: Mar. 19, 2002

(65) Prior Publication Data
US 2003/0182300 A1  Sep. 25, 2003

(51) Int. Cl.
*G06F 17/30* (2006.01)
(52) U.S. Cl. .................... 707/102; 707/101
(58) Field of Classification Search .............. 707/1, 707/2, 3, 4, 5, 6, 7, 8, 9, 10, 101, 102, 103, 707/100, 104.1; 705/10
See application file for complete search history.

(56) References Cited

U.S. PATENT DOCUMENTS

| | | | |
|---|---|---|---|
| 5,918,232 A * | 6/1999 | Pouschine et al. | 707/103 R |
| 6,167,405 A * | 12/2000 | Rosensteel et al. | 707/102 |
| 6,205,447 B1 * | 3/2001 | Malloy | 707/102 |
| 6,377,934 B1 * | 4/2002 | Chen et al. | 705/10 |
| 6,484,179 B1 * | 11/2002 | Roccaforte | 707/102 |
| 6,581,068 B1 * | 6/2003 | Bensoussan et al. | 707/104.1 |
| 6,594,672 B1 * | 7/2003 | Lampson et al. | 707/103 R |
| 6,721,749 B1 * | 4/2004 | Najm et al. | 707/100 |

OTHER PUBLICATIONS

Pendse, Nigel, "Once strictly a big-iron application, OLAP is moving to desktop spreadsheets, business software, and the Web", *OLAP Omnipresent*, pp. 1-11, and figure, "Different Styles of OLAP", downloaded from the Internet, http://www.byte.com/art/98002/sec6/art7.htm, (Jan. 26, 2002).

* cited by examiner

*Primary Examiner*—Jeffrey Gaffin
*Assistant Examiner*—Yicun Wu
(74) *Attorney, Agent, or Firm*—Thelen Reid & Priest LLP

(57) ABSTRACT

A method of operating a multi-dimensional database is disclosed. In this method, a multi-dimensional portion of the data is transferred to a multi-dimensional database. A relational portion of the cube is kept in the relational database. When data from the relational portion needs to be accessed, the system produces the SQL queries to obtain data from the relational database.

9 Claims, 11 Drawing Sheets

| Year | Quarter | Month | County | Product Type | Total Sales |
|---|---|---|---|---|---|
| 2002 | Q1 | Jan | SC | Ice Cream | 50 |
| 2001 | Q4 | Dec | SC | Ice Cream | 100 |
| | Q4 | Nov | SC | Ice Cream | 70 |
| | Q4 | Oct | SC | Ice Cream | 60 |
| | Q3 | Sept | SC | Ice Cream | 80 |
| | Q3 | July | SC | Ice Cream | 110 |
| | Q3 | June | SC | Ice Cream | 120 |
| | Q2 | May | SC | Ice Cream | 150 |

FIG. 8A

| Year | Quarter | Month | Date | County | Product Type | Total Sales |
|---|---|---|---|---|---|---|
| 2002 | Q1 | Jan | 31 | SC | Ice Cream | 0 |
| | Q1 | Jan | 30 | SC | Ice Cream | 5 |
| | Q1 | Jan | 29 | SC | Ice Cream | 3 |
| | Q1 | Jan | 28 | SC | Ice Cream | 1 |
| | Q1 | Jan | 27 | SC | Ice Cream | 0 |
| | Q1 | Jan | 26 | SC | Ice Cream | 2 |
| | Q2 | Jan | 25 | SC | Ice Cream | 0 |
| | Q3 | Jan | 24 | SC | Ice Cream | 0 |

FIG. 8B

METHOD OF SPLITTING A MULTI-DIMENSIONAL CUBE BETWEEN A MULTI-DIMENSIONAL AND A RELATIONAL DATABASE

FIELD OF THE INVENTION

The present invention relates to multi-dimensional databases.

BACKGROUND OF THE INVENTION

Relational databases are a collection data items organized as a set of formally described tables from which data can be accessed or reassembled in different ways without having to reorganize the database tables.

The standard user and application program interface for relational databases is the Structured Queried Language (SQL). A relational database is a set of tables containing data fitted into predefined categories. Each table contains one or more data categories in the column. Each row contains a unique data element for the categories defined by the columns. Tables describe categories such as an order, product, customer, date, and sales price.

The relational database, arranged in tables, may be too slow for on-line analytical processing (OLAP) applications. A multi-dimensional database rapidly process data to quickly generate responses to on-line requests. Multi-dimensional databases use the concept of a cube to represent dimensions of the data available to the user. For example, dimensions can include product, geography, time or other dimensions. Additionally, the Multi-dimensional database creator can define hierarchies and levels within a dimension (for example, quarter and month levels within a time hierarchy).

Frequently, multi-dimensional databases are created using input from existing relational databases. Data is transferred and processed for the multi-dimensional database in order to allow for rapid analysis by users. Not all of the data in the relational database can typically be transferred into the multi-dimensional database since relational databases can be much larger than Multi-dimensional databases It is desired to have an improved system for operating a multi-dimensional database.

SUMMARY OF THE INVENTION

Exemplary embodiments of the present invention relate to a method, the method comprising transferring data from a relational database to a multi-dimensional database. The multi-dimensional database stores data for multiple data dimensions down to predetermined levels in each dimension hierarchy. The method includes enabling access to the relational database for data not stored in the multi-dimensional database. The method includes responding to multi-dimensional data requests by first accessing the multidimensional database and, if necessary, accessing the relational database by constructing queries to the relational database.

Exemplary embodiments of the present invention are directed to a system comprising a multi-dimensional database storing data for multiple data dimensions down to first predetermined levels in each dimension hierarchy. The system includes a relational database with access enabled for data not stored in the multi-dimensional database. The multi-dimensional data requests cause data to be obtained from the multidimensional database and, if necessary, data is obtained from the relational database by constructing queries to the relational database.

In an exemplary embodiment, a user selects multi-dimensional and relational portions of a hierarchy for each dimension. When the user requests data that is in the relational portion of the relational database but not in the multi-dimensional portion stored in the multi-dimensional database, the system will produce queries to the relational database to obtain data in the relational portion left behind in the relational database.

In an exemplary embodiment of the present invention, a graphical interface is used that allows a selection of multi-dimensional and relational portions of at least one hierarchy for at least one dimension. The selection is done by selecting levels in the hierarchy for which the multi-dimensional portion is to be built and selecting second levels below the first level in which the relational portion is enabled. Data is obtained from the multi-dimensional proportion from a multi-dimensional database and data is obtained from the relational portion by constructing queries to a relational database.

In an exemplary embodiment, a multi-dimensional portion, blocked portion and relational portion of at least one hierarchy for one dimension is selected. Data is then transferred between the relational database and the multi-dimensional database for the multi-dimensional portion and, thereafter, the size of the blocked and relational portions are modified.

In an exemplary embodiment of the present invention, a multi-dimensional portion and relational portion of at least one hierarchy for at least one dimension is selected. Metadata is produced. The metadata indicates a partition between the multi-dimensional and relational portions and for each member of the lowest level of the multi-dimensional portion of the hierarchy. The metadata indicates whether any child nodes exist below the partition. Data is obtained from the multi-dimensional portion from a multi-dimensional database and obtained from the relational portion by constructing queries to the relational database, the queries being constructed using the metadata.

BRIEF DESCRIPTION OF THE DRAWING FIGURES

FIGS. 8A and 8B are diagrams that illustrate examples of a spreadsheet display for one embodiment of the system of the present invention.

DETAILED DESCRIPTION OF THE INVENTION

An exemplary embodiment of the present invention is directed to a system. The system comprises a multi-dimensional database storing data for multiple data dimensions down to first predetermined levels in each dimension hierarchy. The system includes a relational database with access enable for data not stored in the multi-dimensional database. The multi-dimensional data requests cause data to be obtained from the multidimensional database and, if necessary, data to be obtained from the relational database by constructing queries to the relational database.

Figure 1A:
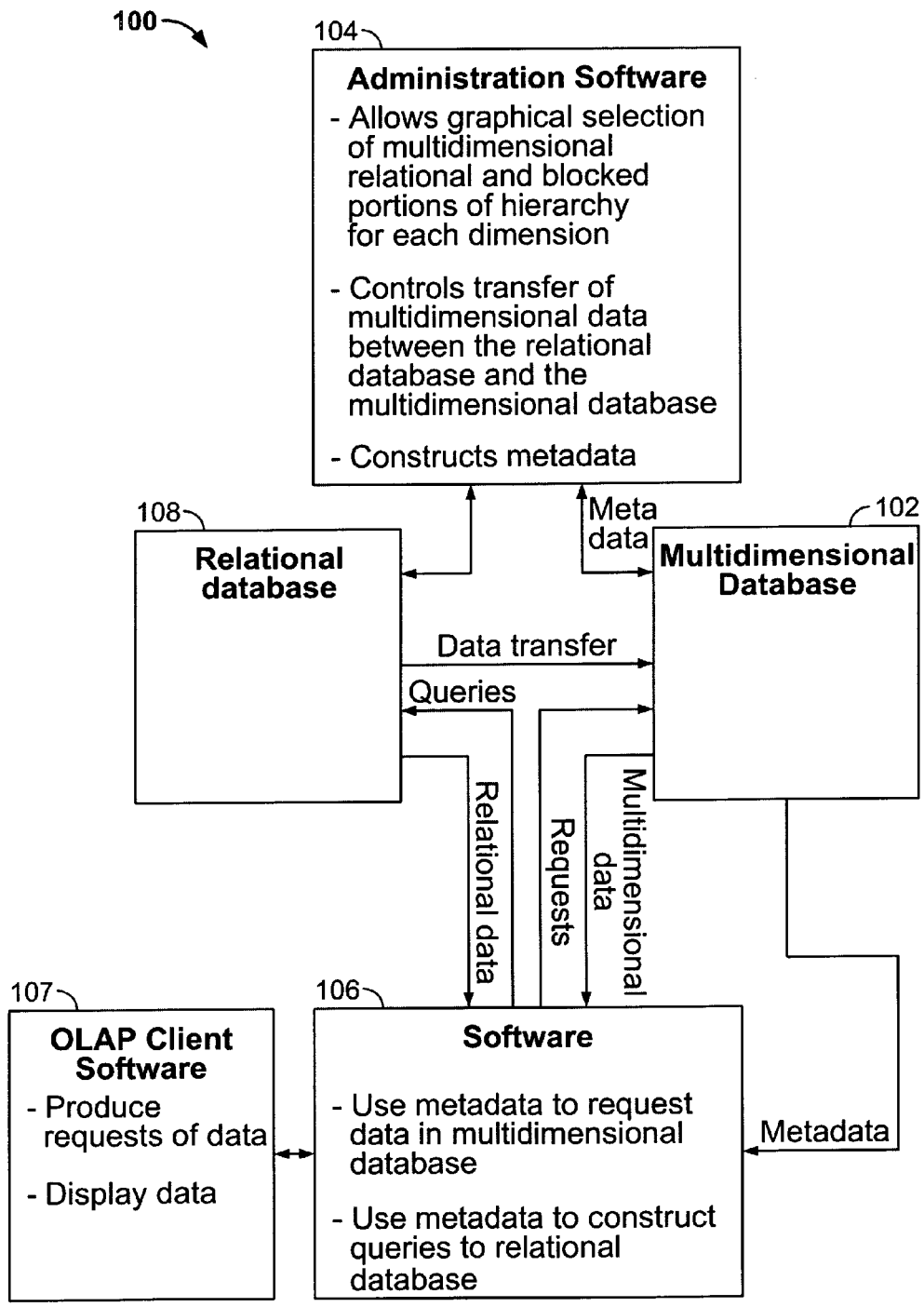
FIG. 1A is a diagram that illustrates an exemplary embodiment of the present invention.
Figure 1B:
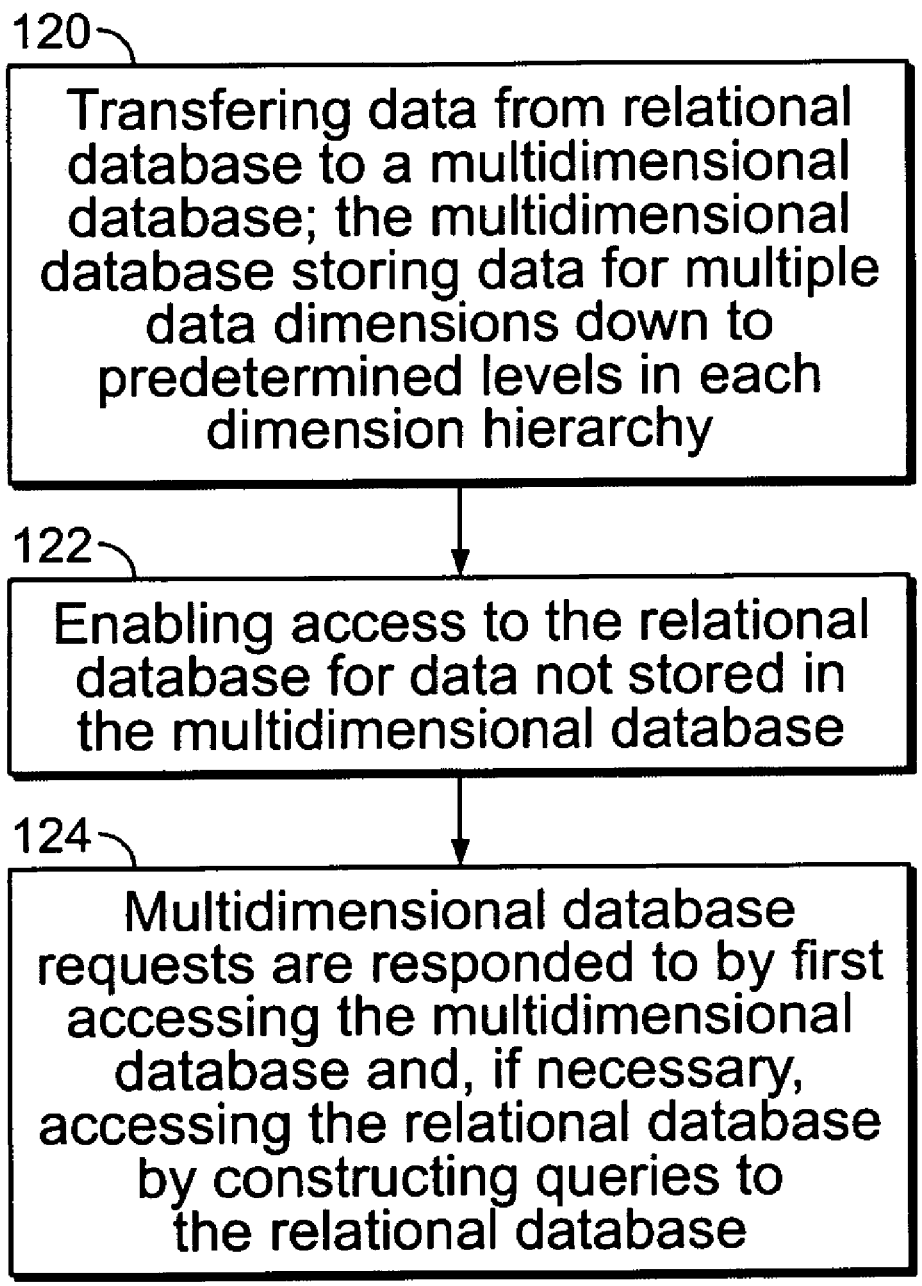
FIG. 1B is a flowchart that illustrates an exemplary embodiment of the present invention.

In the example of FIG. 1, the system 100 comprises a multi-dimensional database 102 storing data for multiple data dimensions down to first predetermined levels in each dimension hierarchy. The system includes a relational database 108 with access enable for data not stored in the multi-dimensional database. Multi-dimensional data requests cause data to be obtained from the multidimensional database 102 and, if necessary, data to be obtained from the relational database 108 by constructing queries to the relational database.

In an exemplary embodiment, the multi-dimensional database 102 is a database that is arranged to allow for On-Line analytical Processing (OLAP) and to respond to multi-dimensional data requests. Examples of Multi-dimensional databases include MicroSoft OLAP Services and Oracle's Express.

in an exemplary embodiment, the relational database 108 is arranged in a star schema, including dimensional tables and fact tables. The use of the star schema simplifies the transfer of data to the multi-dimensional database 102.

In an exemplary embodiment, administrative software 104 is used to allow the graphical selection of multidimensional, relational and blocked portions of the hierarchy for each dimension. Administrative software 104 also controls the transfer of the multi-dimensional data between the relational database and the multi-dimensional database. A number of transfer methods are available for multi-dimensional databases. In an exemplary embodiment, data is manipulated to make it more easy for on-line analysts to obtain the analysis results.

Additionally, in an exemplary embodiment, the administrative software 104 creates metadata reflecting a partition between the multi-dimensional and relational portions. In an exemplary embodiment, the metadata indicates the partition between the data store in the multi-dimensional database and the data stored in the relational database. In an exemplary embodiment, the metadata indicates for each member of the lowest level of the multi-dimensional portion of the hierarchy whether any child node exists below the partition.

In an exemplary embodiment. Software 106 produces requests into the multi-dimensional database. In an exemplary embodiment, software 106 uses the metadata to construct queries into the relational database to obtain data for the relational portion data.

In an exemplary embodiment, the data from the relational database 108 is displayed to the user along with the data from the multi-dimensional database 102 using OLAP client software 107. The OLAP client software 107 does not need to known whether the data is stored in the relational or multi-dimensional database.

In an exemplary embodiment, the multi-dimensional, relational, and blocked portion are selectable graphically.

An exemplary embodiment of the present invention relates to a method. The method comprises transferring data from a relational database to a multi-dimensional database. The multi-dimensional database stores data for multiple data dimensions down to predetermined levels in each dimension hierarchy. The method includes enabling access to the relational database for data not stored in the multi-dimensional database. The method includes responding to multi-dimensional data requests by first accessing the multidimensional database and, if necessary, accessing the relational database by constructing queries to the relational database.

Figures 2A, 2B:
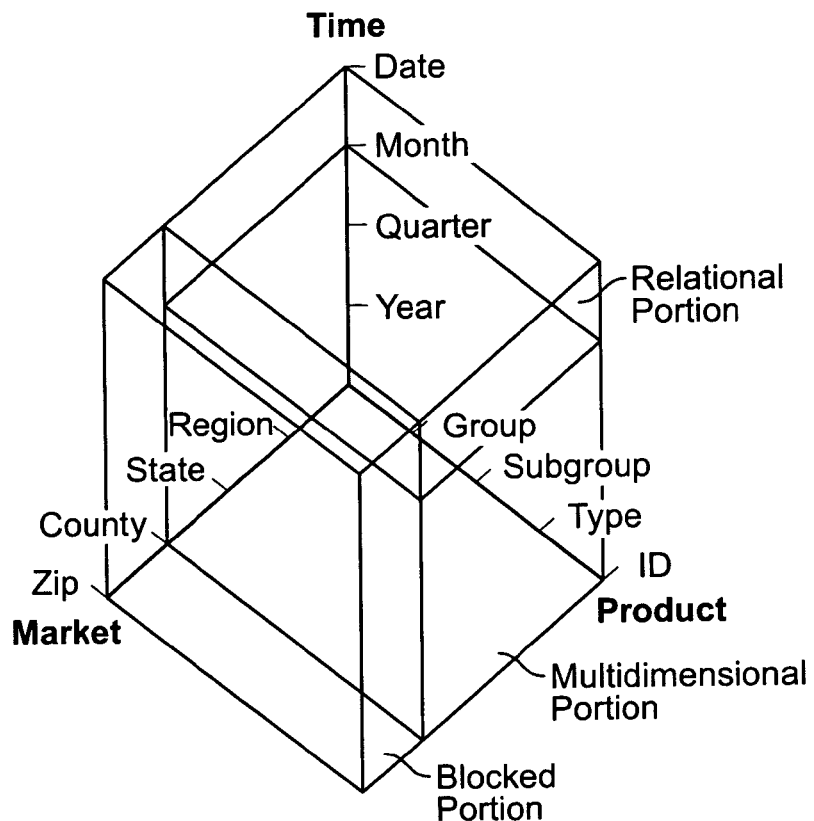
FIG. 2A is a diagram that illustrates examples of hierarchies.
FIG. 2B is a diagram that illustrates the cube used for the example of FIG. 2A, illustrating the multi-dimensional, blocked and relational portions.

FIGS. 2A and 2B illustrate of a hierarchy of thrfee dimensions. The dimensions, in this example, are product, time and market. In the example of FIGS. 2A and 2B, the product dimension includes the hierarchy levels; product group, product sub-group, type and product ID. The time dimension includes the hierarchal levels; year, quarter, month, date. The market dimension includes the hierarchal levels; region, state, county and zip code. Although three dimensions are shown, dimensions of four or greater are also use. In the example of FIGS. 2A and 2B, the hierarchy levels are selected as being multi-dimensional, relational, or blocked. In this example, the date level of the time hierarchy is indicated as being relational and the zip code level of the market hierarchy is indicated as being blocked.

In one embodiment, there are levels in between the multidimensional portion of a dimension and the relational portion that are not available for access. Thus multidimensional and relational levels do not have to be contiguous. For example:

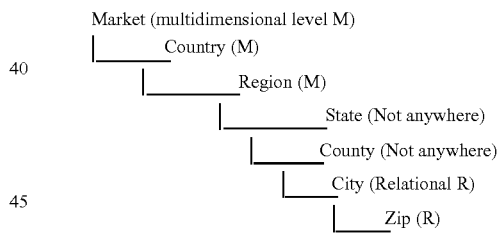

So in this example, drilling down on region level returns cities instead of states because state and county levels are skipped.

FIG. 2B illustrates an example of a multi-dimensional cube. The multi-dimensional portion includes the data transferred to the multi-dimensional database. In an exemplary embodiment of a multidimensional database, each of the intersections of the database have pre-calculated data. For example, at the intersection region, year, group, which is within the multi-dimensional portion, calculations are done for each specific product group, each specific region and each specific year. This recalculated data is stored in the multi-dimensional database so that this data is easily accessible for on-line analysis. The relational portion includes data that requires queries to be made to the relational database and cannot be obtained directly from the multi-dimensional database. In this example, if one wanted to know the amount of a specific product group sold on a certain date in a given state, one would have to obtain this information from the relational database. This data is obtained by constructing queries to the relational database.

The blocked levels, in this example, include the zip code. No data categorized by zip code can be obtained. The blocked data is not accessible through the system.

In an exemplary embodiment, a graphical system is used to select which levels in the hierarchy to place with the relational, multi-dimensional and blocked portions. In an exemplary embodiment, the relational portion, multi-dimensional portion and blocked portion can be modified. In a preferred embodiment, the multi-dimensional portion is determined before the transfer of data between the relational database and the multi-dimensional database occurs off-line. In an exemplary embodiment, the selection between the relational and blocked portions occurs after the data transfer.

Figure 3:
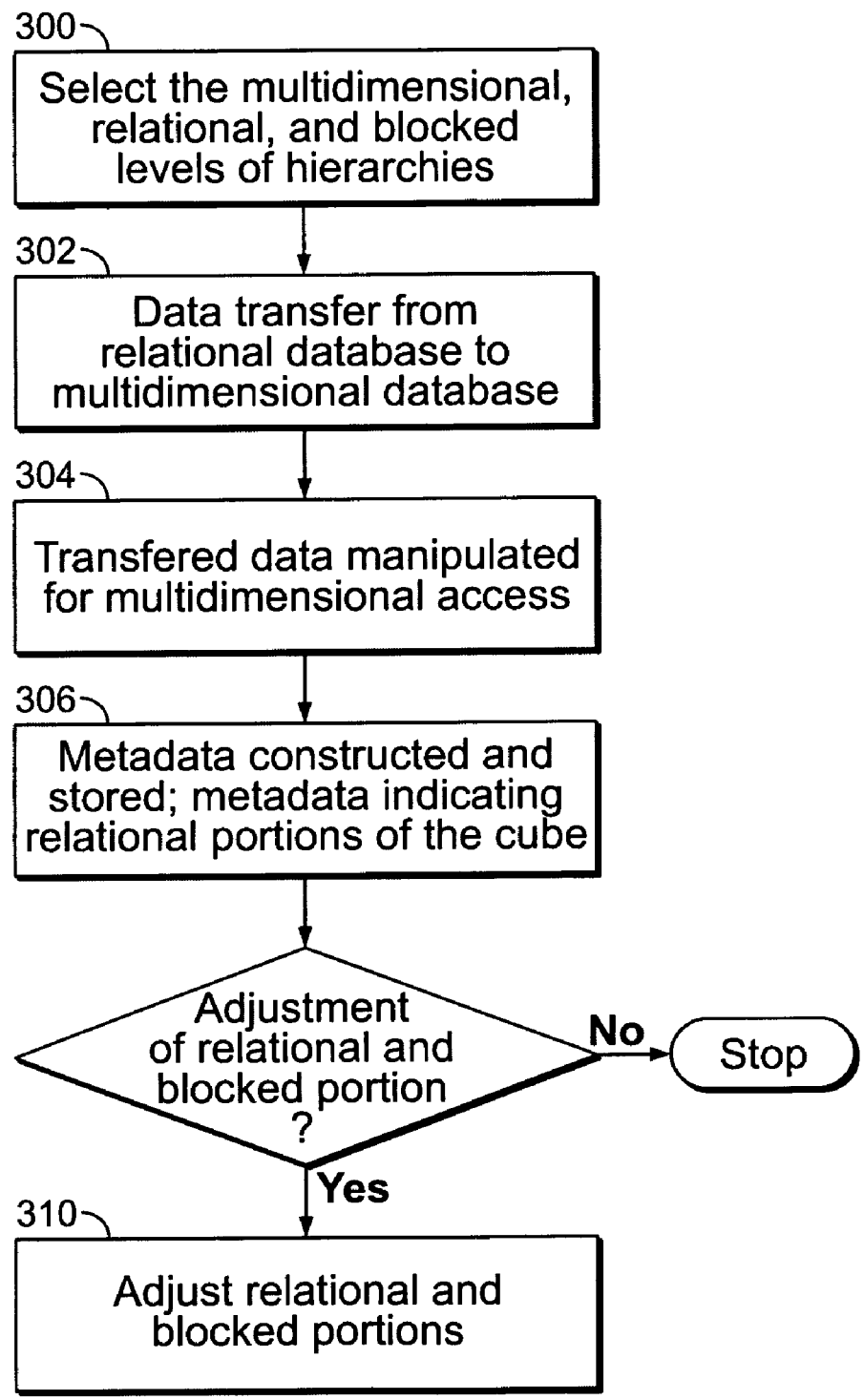
FIG. 3 is diagram illustrating an exemplary method of the present invention.

FIG. 3 illustrates a flowchart for an exemplary embodiment of the present invention. In step 300, the multi-dimensional, relational and blocked levels of the hierarchy are selected. In step 302, data is transferred between the relational database to the multi-dimensional database for the multi-dimensional portion of the data. In step 304, the transferred data is manipulated for multi-dimensional access. As described above, typically the values need to be calculated for a variety of a level combinations that are contained within the multi-dimensional portion. In step 306, the metadata is constructed and stored. In a preferred embodiment, the metadata indicates the relational portions of the cube, as well as indicating whether there are any members at the lowest multi-dimensional level has any child units. Later, in step 310, the relational and blocked portions can be adjusted and this causes the metadata to be modified as well.

Figure 4:
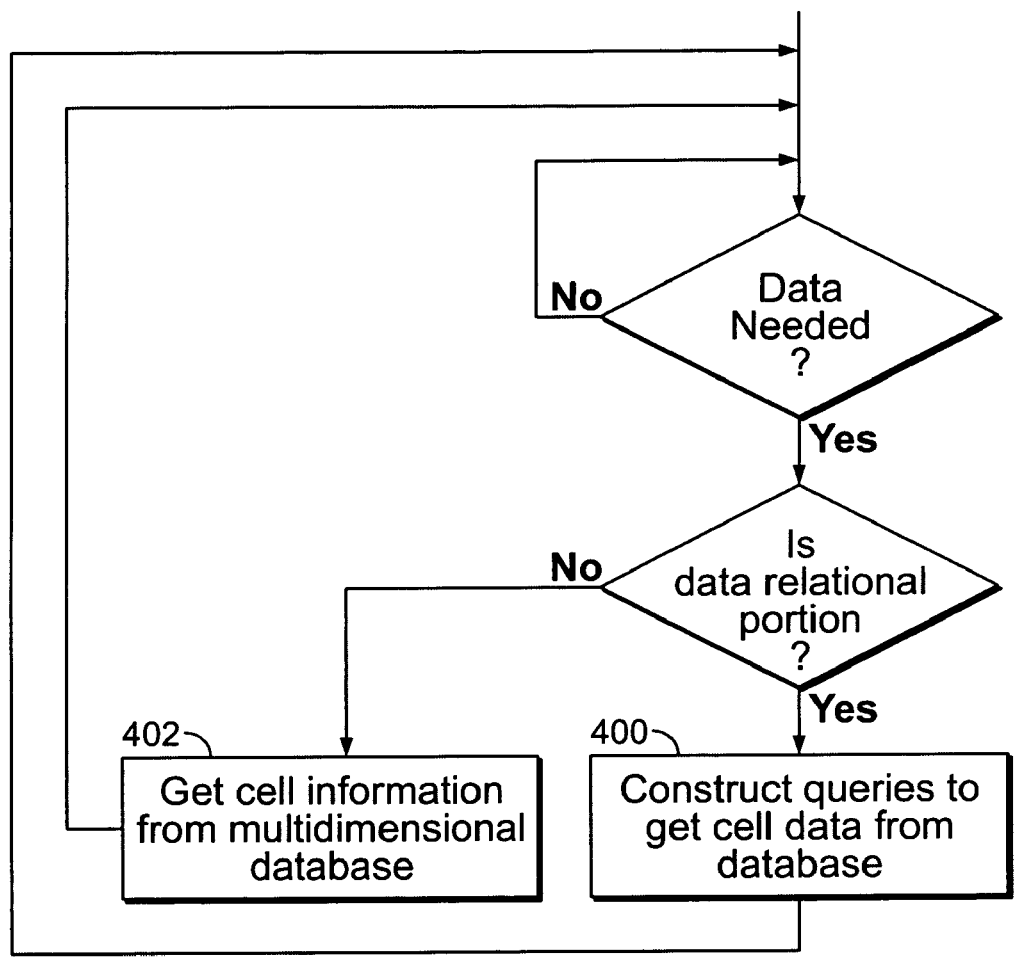
FIG. 4 is a diagram illustrating an exemplary method of the present invention.

FIG. 4 illustrates a flowchart for an exemplary embodiment. If data is needed, it is determined whether the data is from the relational portion, If so, information is obtained using the multi-dimensional database in step 400. If the data is from the multi-dimensional database, then it is obtained from the multi-dimensional data in step 402.

Figure 5:
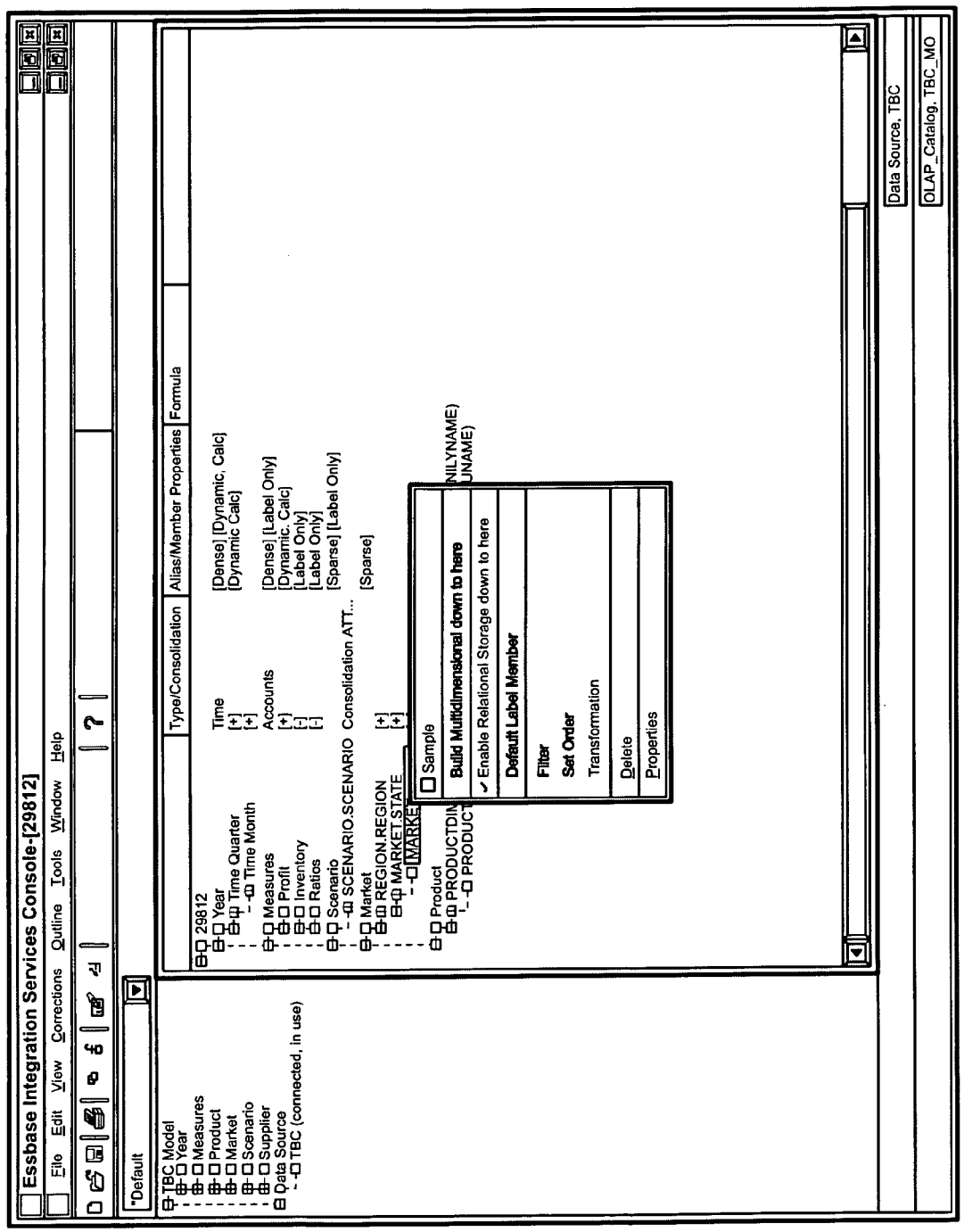
FIG. 5 is a diagram that illustrates a display of the hierarchies that allows the selecting of the relational and multi-dimensional storage.

FIG. 5 illustrates an example of a graphical interface which is used to select whether a level in the hierarchy is part of the multi-dimensional portion, the relational portion or the block portion. FIG. 5 illustrates an example in which the levels of the hierarchy are selectable by the use or obtained from the star schema in a relational database. The user selects whether each level in the hierarchy is within the multi-dimensional database or relational or blocked portions. In a preferred embodiment, for a specific level, the user clicks on a level to build down the multi-dimensional portion to that level. Additionally, the user can click on a lower level and enable relational storage down to that level. In an exemplary embodiment, all levels above the clicked-on the lowest multi-dimensional level are built into the multi-dimensional database and all of the levels between the lowest multi-dimensional level and the lowest enabled relational level are enabled from the relational portion. Below the lowest enabled relational level are blocked levels. In the example shown in FIG. 5, the administrator chooses to build the "market" dimension down to the "state" level into the multi-dimensional database. The user then enables the relational storage down to the next lower level of the hierarchy. Any number of dimensions can be partitioned in this fashion.

Figure 6:
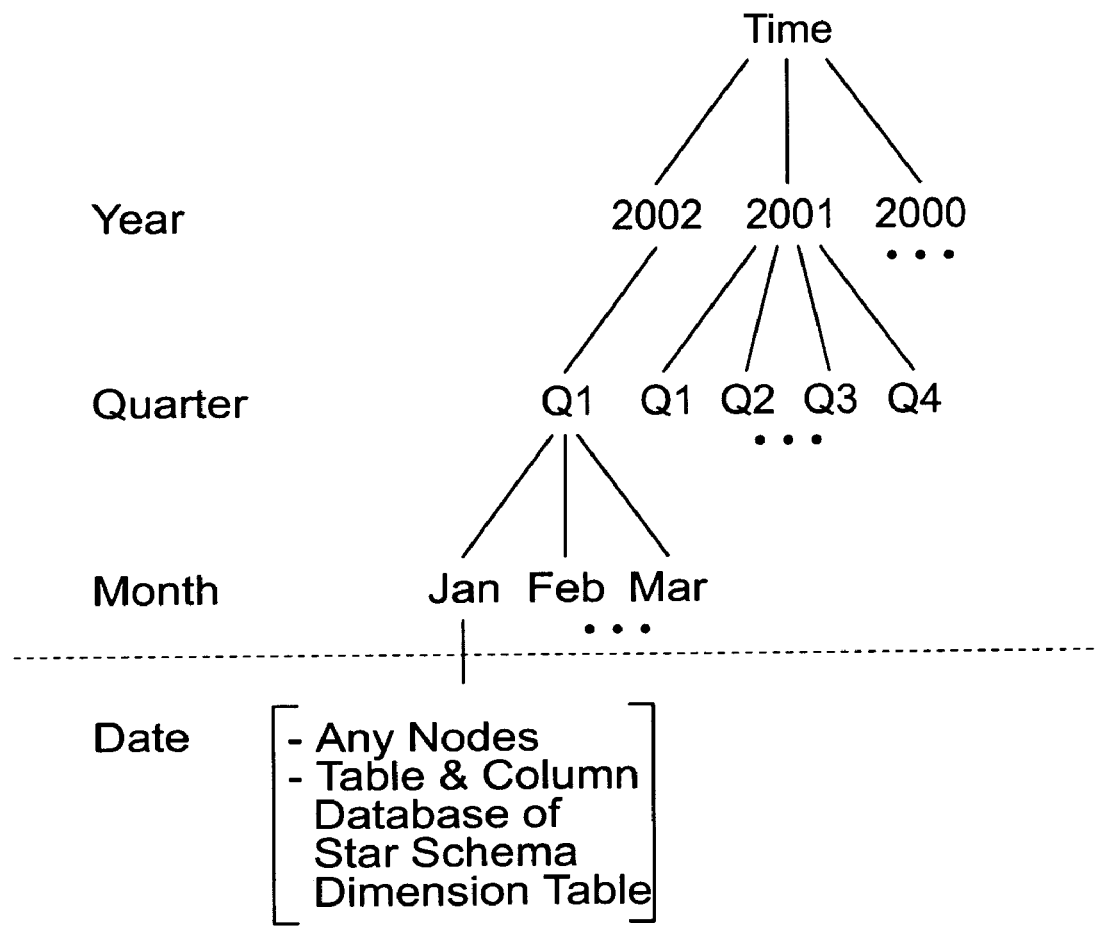
FIG. 6 is a diagram that illustrates metadata used in one embodiment of the present invention.

FIG. 6 illustrates an example of metadata stored for the system of one embodiment of the present invention. The metadata shows for the time hierarchy the multi-dimensional database enable levels: year, quarter and month, and the relational database enabled level; data. Different members for each level are shown.

In an exemplary embodiment, each member of the lowest multi-dimensional level, in this case, month, has associated metadata. In the example of FIG. 6, the member "January" of the level "month" has associated with it metadata indicating whether there are any child nodes stored in the relational database. Additionally, in a preferred embodiment, table, column, database indicators of a star schema dimension table, associated with the relational level, are also stored. In an exemplary embodiment, the relational database uses a star schema, and the data within the fact tables of the star schema are modified in the relational database without requiring an update of the metadata. Even when the contents of the dimension levels in the relational portion of the cube change, transparent access to the relational database is maintained.

Figure 7:
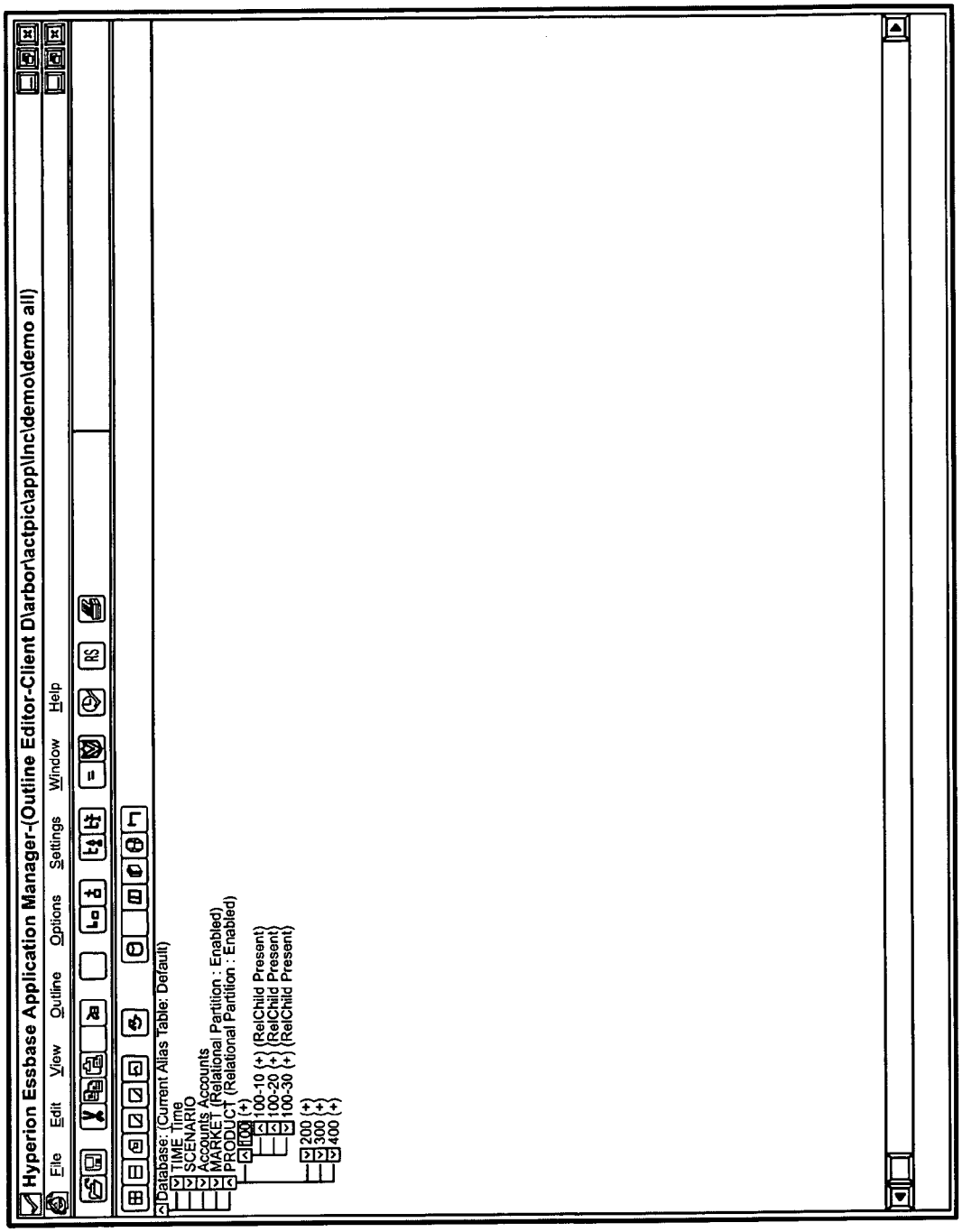
FIG. 7 is a diagram that illustrates a graphical interface showing the access to elements of the hierarchy.

FIG. 7 illustrates an example of how leaf elements of the multi-dimensional portion of the cube track information about whether there are members in the relational portion of the split cube that can be accessed by drilling down the hierarchy. The metadata information is captured when the cube is built. In case of an unbalanced hierarchy, only leaf level elements that have their hierarchies extended need to track this information. Storing whether there are any child nodes of a leaf in the metadata helps the system handle ragged hierarchies.

The end-user interacts with the multi-dimensional cube, including the multi-dimensional portion and the relational portion without knowing whether the cube is split between the stores. In an exemplary embodiment, all hierarchal navigational capabilities are available for both the multi-dimensional and relational portions of the cube. In an exemplary embodiment, only navigation among hierarchies of dimensions that have been split is tracked to determine if the cube boundary needs to be crossed for data or metadata access. Information associated with leaf level members about whether the hierarchy continues beyond the member is used to determine if there is a need to access a relational source.

In an exemplary embodiment, the end user can either choose to view the entire cube as a transparent logical entity or to be notified when the cube boundary is crossed.

FIGS. 8A and 8B illustrate spreadsheet displays for the examples shown in FIGS. 2A and 2B. In the example of FIG. 8A, if a user decides to find out more information about the time dimension, the user can click on January, Quarter 1, 2002. By clicking on the January portion of the spreadsheet, the user drills down to the next lowest level in the time hierarchy, in this case, the date information. As shown in the example of FIGS. 2A and 2B, the date information is stored in a relational portion of the database. Thus, the system constructs the queries to the relational database to get this data. The production of the queries may depend upon the spreadsheet arrangement. Note, in the examples of FIGS. 8A and 8B, the total sales figures for January 24–31 need to be obtained from the relational store to update the display. As the user scrolls down the display, additional data needs to be accessed from the relational database.

In one embodiment, when the user clicks upon January, the metadata is checked to see whether January Q1, 2002 has any child elements at the date level, which is part of the relational portion of the cube. In this case, there are a number of level members for the date. The level members for the date are obtained from column values of the dimension table in the star schema of the relational database.

In an exemplary embodiment, metadata is used to quickly get the date level members from the dimensional table using an SQL query. If the metadata had indicated that there are no members of the child level, access to the relational database need not be done. Using the date values obtained from the dimensional table, values of the total sales information can be obtained from the fact table in another round of SQL queries.

The arrangement of the display can influence the construction of the queries by the system. For example, data below the screen display need not be obtained right away. In one example, if there are thousands of members of a specific level stored in the relational store, it does not make sense to do a SQL query that obtains a large amount of data which requires buffering and which might not ever be displayed.

Figure 9:
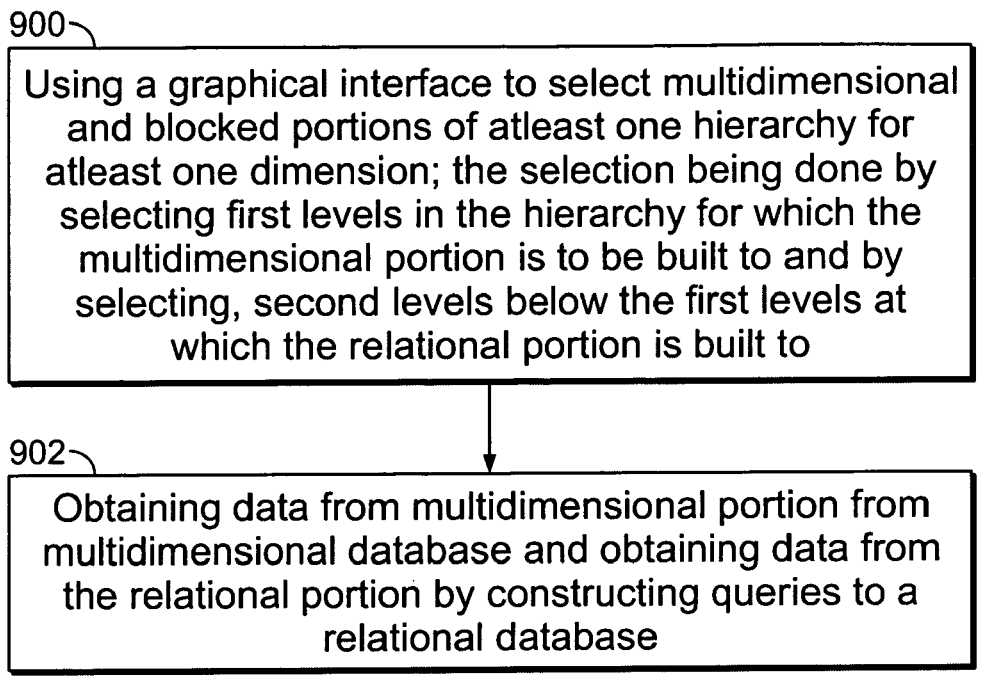
FIG. 9 is a diagram of a flowchart of an exemplary embodiment of the present invention.

FIG. 9 illustrates a flowchart of an exemplary embodiment of the present invention. In step 900, a graphical interface is used to select multi-dimensional and blocked portion of at least one hierarchy for at least one dimension, the selection being done by selecting a first level in the hierarchy for which the multi-dimensional portion can be built down to and for selecting a second level, below the first level, at which the relational portion is built down to. In step 902, data is obtained from the multi-dimensional portion from a multi-dimensional database and data is obtained from a relational portion by constructing queries to a relational database.

Figure 10:
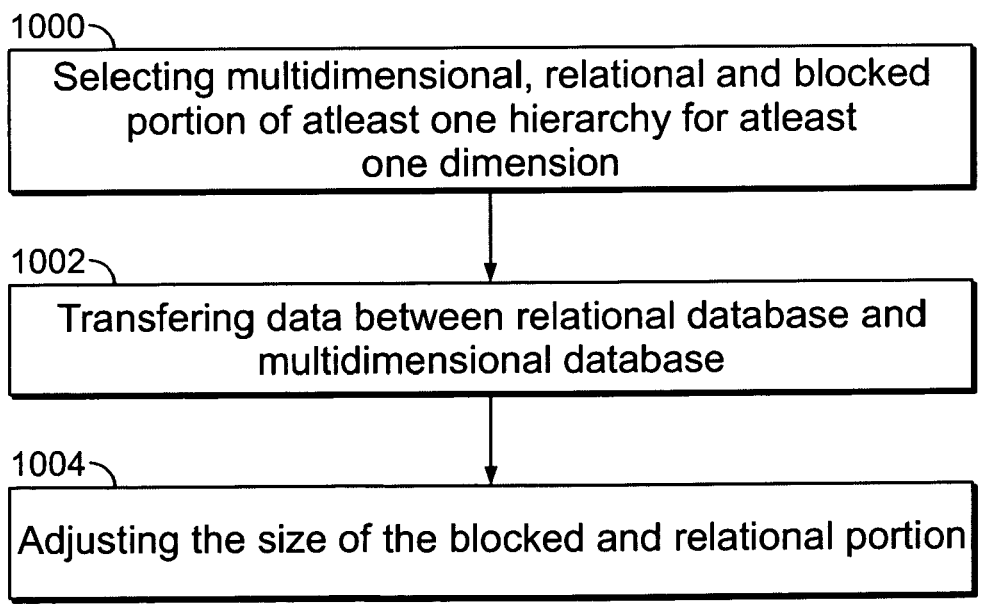
FIG. 10 is a flowchart of an exemplary embodiment of the present invention.

FIG. 10 illustrates the flowchart of an exemplary embodiment of the present invention. In step 1000, the multi-dimensional, relational and blocked portions of a least one hierarchy are selected. In step 1002, data is transferred between the relational database and the multi-dimensional database. In an exemplary embodiment, this database is arranged and manipulated so as to speed the multi-dimensional database access. In step 1004, after the transfer of the data, between the relational database and the multi-dimensional database, the size of the blocked and relational portions can be modified, preferably by using the graphical interface.

Figure 11:
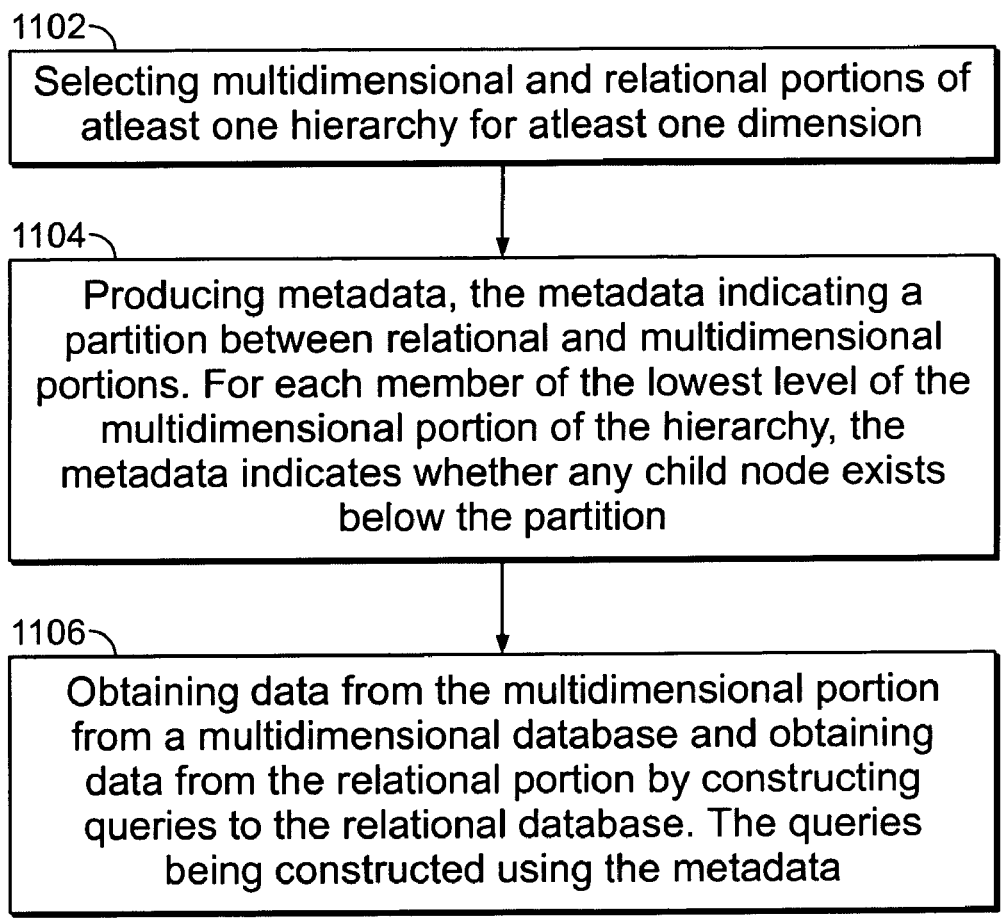
FIG. 11 is a flowchart of an exemplary embodiment of the present invention.

FIG. 11 illustrates an exemplary embodiment of the present invention. In step 1102, the multi-dimensional and relational portions of at least one hierarchy, for at least one dimension, are selected. In step 1104, metadata is produced, the metadata indicating a partition between the relational and multi-dimensional portions. For each member of the lowest level of the multi-dimensional portion of the hierarchy, the metadata indicates whether any child node exists below that partition. In step 1106, data is obtained from the multi-dimensional portion from a multi-dimensional database and data is obtained from the relational portion by constructing queries to the relational database, the queries being constructed using the metadata.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A method for providing access to data in a hierarchy, the hierarchy having one or more levels, the method comprising:

for each level of the hierarchy, receiving a selection from an administrator as to whether the level is to be stored in a multi-dimension portion, a relational portion, or a blocked portion;

transferring data for each level of the hierarchy selected to be stored in a multi-dimensional portion from a relational database to a multi-dimensional database;

enabling access for users other than said administrator to the relational database for data at levels selected to be stored in a relational portion, while preventing access to data at levels selected to be stored in a blocked portion; and responding to multi-dimensional data requests by first accessing the multidimensional database and, if necessary, accessing the relational database by constructing queries to the relational database.

2. The method of claim 1, further comprising:

constructing metadata regarding one or more of the levels of the hierarchy selected to be stored in a relational portion; and displaying, to one of said users, said metadata regarding one or more of the levels of the hierarchy selected to be stored in a relational portion along with metadata regarding one or more of the levels of the hierarchy selected to be stored in a multi-dimensional portion.

3. The method of claim 1, further comprising:

constructing metadata regarding all levels of the hierarchy selected to be stored in a relational portion or a multi-dimensional portion; and displaying, to one of said users, all of the levels of the hierarchy selected to be stored in a relational portion or a multi-dimensional portion without accessing said relational database by accessing said metadata.

4. An apparatus for providing access to data in a hierarchy, the hierarchy having one or more levels, the apparatus comprising:

means for, for each level of the hierarchy, receiving a selection from an administrator as to whether the level is to be stored in a multi-dimension portion, a relational portion, or a blocked portion;

means for transferring data for each level of the hierarchy selected to be stored in a multi-dimensional portion from a relational database to a multi-dimensional database;

means for enabling access for users other than said administrator to the relational database for data at levels selected to be stored in a relational portion, while preventing access to data at levels selected to be stored in a blocked portion; and means for responding to multi-dimensional data requests by first accessing the multidimensional database and, if necessary, accessing the relational database by constructing queries to the relational database.

5. The apparatus of claim 4, further comprising:

means for constructing metadata regarding one or more of the levels of the hierarchy selected to be stored in a relational portion; and means for displaying, to one of said users, said metadata regarding one or more of the levels of the hierarchy selected to be stored in a relational portion along with metadata regarding one or more of the levels of the hierarchy selected to be stored in a multi-dimensional portion.

6. The apparatus of claim 4, further comprising:

means for constructing metadata regarding all levels of the hierarchy selected to be stored in a relational portion or a multi-dimensional portion; and means for displaying, to one of said users, all of the levels of the hierarchy selected to be stored in a relational portion or a multi-dimensional portion without accessing said relational database by accessing said metadata.

7. A program storage device readable by a machine, tangibly embodying a program of instructions executable by the machine to perform a method for providing access to data in a hierarchy, the hierarchy having one or more levels, the method comprising:

for each level of the hierarchy, receiving a selection from an administrator as to whether the level is to be stored in a multi-dimension portion, a relational portion, or a blocked portion;

transferring data for each level of the hierarchy selected to be stored in a multi-dimensional portion from a relational database to a multi-dimensional database;

enabling access for users other than said administrator to the relational database for data at levels selected to be stored in a relational portion, while preventing access to data at levels selected to be stored in a blocked portion; and responding to multi-dimensional data requests by first accessing the multidimensional database and, if necessary, accessing the relational database by constructing queries to the relational database.

8. The program storage device of claim 7, wherein the method further comprises:

constructing metadata regarding one or more of the levels of the hierarchy selected to be stored in a relational portion; and displaying, to one of said users, said metadata regarding one or more of the levels of the hierarchy selected to be stored in a relational portion along with metadata regarding one or more of the levels of the hierarchy selected to be stored in a multi-dimensional portion.

9. The program storage device of claim 8, wherein the method further comprises;

constructing metadata regarding all levels of the hierarchy selected to be stored in a relational portion or a multi-dimensional portion; and displaying, to one of said users, all of the levels of the hierarchy selected to be stored in a relational portion or a multi-dimensional portion without accessing said relational database by accessing said metadata.

* * * * *